(12) United States Patent
Pew

(10) Patent No.: US 6,757,776 B1
(45) Date of Patent: Jun. 29, 2004

(54) CONTROL TRANSACTION HANDLING IN A DEVICE CONTROLLER

(75) Inventor: Frederick Pew, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 97 days.

(21) Appl. No.: 10/198,508

(22) Filed: Jul. 17, 2002

(51) Int. Cl.[7] .................. G06F 9/00; G06F 13/00
(52) U.S. Cl. .................. 710/310; 710/52; 710/22; 709/101; 370/252
(58) Field of Search ............ 710/100, 56, 105, 710/22, 305, 52, 104, 310, 63; 709/100, 251, 101; 712/30; 370/252; 705/21; 714/47; 713/1

(56) References Cited

U.S. PATENT DOCUMENTS

| | | | | |
|---|---|---|---|---|
| 5,991,546 A | * | 11/1999 | Chan et al. ............... | 710/62 |
| 6,157,975 A | * | 12/2000 | Brief et al. ............... | 710/104 |
| 6,205,501 B1 | * | 3/2001 | Brief et al. ............... | 710/100 |
| 6,449,666 B2 | * | 9/2002 | Noeldner et al. ......... | 710/23 |
| 6,678,760 B2 | * | 1/2004 | Brief ......................... | 710/52 |

OTHER PUBLICATIONS

"Laboratories for data communication and computer networks" by R. Goyal, S Lai, R. Jain and A. Durresi (abstract only).*

"Service guarantees in deflection networks" by W. Olesinski and P. Gburzynski (abstract only).*

* cited by examiner

Primary Examiner—Gopal C. Ray
(74) Attorney, Agent, or Firm—Marger Johnson & McCollom PC

(57) ABSTRACT

Embodiments of the invention prevent data from being mishandled at a connected device using a system that verifies that data received after receiving a setup command portion of a control transaction is received without errors and/or without receiving a second setup command used to cancel the first. In some embodiments, a control transaction is processed by receiving a setup token and setup data, setting a predetermined memory location to write the setup data, and then preventing the setup data read from the memory from being acted on until the device verifies that no superceding commands have been received by the device.

20 Claims, 4 Drawing Sheets

CONTROL TRANSACTION HANDLING IN A DEVICE CONTROLLER

TECHNICAL FIELD

This disclosure relates to transaction handling, and, more particularly, to efficiently handling control transactions in a configurable USB (Universal Serial Bus) device controller.

BACKGROUND

A USB (Universal Serial Bus) carries data communication between a host computer and devices coupled to the computer via the bus. USB specifications 1.1 and 2.0 define a method of how a host makes requests of a device, which is by using what are termed control transactions. Generally, when the host desires a device to perform some function, the host sends a control transaction via the bus to the device. The device decodes the control transaction and acts on it. Control transactions are broken into three stages: a setup stage, an optional data stage, and a status stage.

A host begins a control transaction directed to a device by sending a setup token to the device. The setup token alerts the device that an 8-byte data packet is being sent, which is part of the setup stage and describes the request to be completed by the device. The device decodes the setup packet to determine, among other things, whether the host is sending a data stage.

Occasionally, the host will cancel a current transaction request by sending a second request before the first request has been completely processed. Specifically, if a new setup token is received by the device prior to receiving the data stage and/or status stage of the prior request, the device flushes the old request and immediately begins processing the new request contained in the new setup stage.

Earlier devices allocated a specific portion of memory space to store the setup stage data. These devices used a handshake protocol so that the processor could determine if a second request had arrived while the processor was responding to the first request. However, there is a serious potential problem in implementing this requirement in newer, microprocessor based device controllers that use a FIFO (First In First Out) buffer memory to buffer data from the host until such time that the microprocessor can operate on it. Oftentimes the FIFO buffer in such a device is also used for DMA (Direct Memory Access) transfers between the FIFO and a system memory. With such a system, it is possible to transfer out of the device by DMA a newly received setup token or setup data that was received from the host and temporarily stored in the FIFO, prior to the device recognizing that it ever received such a token or data.

Embodiments of the present invention prevent this and other problems in handling control transactions.

SUMMARY OF THE INVENTION

Embodiments of the invention prevent data from being mishandled at a device connected to a host by using a system that verifies that data received after receiving a setup command is received without errors and/or without receiving a second setup command used to cancel the first. In some embodiments, a control transaction is processed by receiving a setup token, preparing a predetermined memory location to store setup data, and then preventing any setup data from being acted on until the device verifies that no superceding commands have been received by the device.

Other embodiments of the invention are directed toward the device itself. Such a device can include a port to receive a control transaction, and a pair of pointer controllers. The first controller resets a write pointer of a data buffer to a preset memory location in the data buffer. The second controller locks a read pointer in the place it was in when the control transaction was received.

The foregoing will become more readily apparent from the following detailed description of a preferred embodiment of the invention, which proceeds with reference to the accompanying drawings.

DETAILED DESCRIPTION

Figure 1:
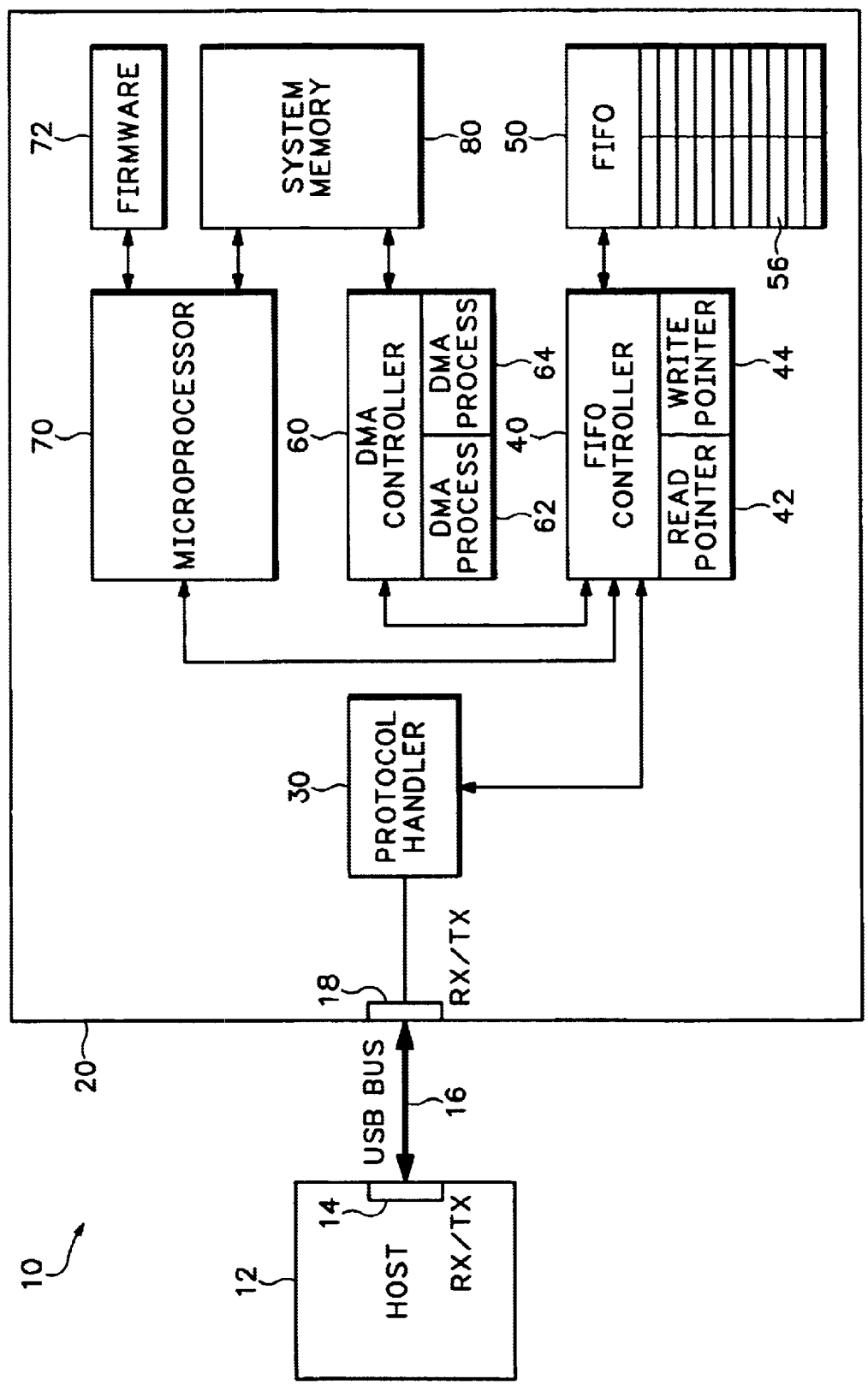
FIG. 1 is a block diagram of a system including a host and a device coupled to the host via a bus.

FIG. 1 is an example functional block diagram showing a device controller 20 according to embodiments of the invention. A communication system 10 includes a host 12, which could be a computer or other host device, which also includes a bus interface 14. A bus 16, which could be a USB, is coupled between the bus interface 14 of the host 12 and an interface 18 of a device 20. The device 20 is thereby coupled to the host 12 and communicates with the host 12 via the bus 16.

The device 20 includes a protocol handler 30, the functions of which will be later described. The protocol handler 30 is coupled to a FIFO controller 40 which, of course, is coupled to a FIFO 50. The FIFO 50, for purposes of explanation, is shown as an individual block, but in implementation the FIFO would most likely be a dynamic partition in memory contained within the device 20. Additionally, there would likely be more than one FIFO 50 partitioned in the memory at a single time, but only one FIFO is shown here for clarity. Typically there is one FIFO 50 set up for each endpoint coupled to the BUS 16.

The FIFO controller 40 includes a read pointer 42 and a write pointer 44, which "point" to particular memory addresses 56 within the FIFO 50. As data is written into the FIFO 50, the write pointer 44 shifts to the next available memory location in the FIFO to write additional data. Similarly, as data is read from the FIFO, the read pointer 42 shifts to the next memory location in the FIFO 50 holding the next data item.

A DMA controller 60 is coupled to and communicates with the FIFO controller 40 to process direct memory transfers from the FIFO 50 to a system memory 80. The DMA controller 60 may have one or more DMA processes 62, 64 set up for data transfer. Transferring data in this way bypasses the necessity for a microprocessor 70 to manage the data transfer, thereby freeing its resources for other tasks. The microprocessor 70 is coupled to the system memory 80, which can be used to store data and instructions for use by the microprocessor. Additionally, a set of firmware 72 is coupled to the microprocessor 70. The firmware 72 contains previously stored instructions and/or data that is useable by the microprocessor 70 during operation. As is known in the art, the firmware 72 can be updated to change the operation of the microprocessor 70.

The particular connections between the components within the device 20 are only illustrative and are not the only way in which the device can operate. Other embodiments may have connections between additional or different components. For instance, although the microprocessor 70 is shown as being connected to the FIFO controller 40, it may additionally or alternatively be connected directly to the FIFO 50.

When the host 12 requests the device 20 to perform a function, it sends a control transaction to the device. The control transaction begins with a setup token, which can be any type of pre-determined data signal. The setup token is followed by an 8-byte (64 bit) data packet, which is part of the setup stage, describing the function to be performed by the device 20. This data packet is stored in the FIFO 50. The microprocessor 70 must then retrieve the data from the FIFO 50, either directly, or from the system memory 80 after a DMA transfer. The microprocessor 70 then begins setting up procedures based on the received setup stage of the control transaction, such as setting up DMA transactions 62, 64 in the DMA controller 60 for succeeding data stages, or executing particular instruction sequences to fulfill the host's request.

As described above, the host 12 may send a second setup token, which acts to cancel the prior command requests and inform the device 20 that a new command requests is to be performed. At the time the new setup token arrives, the data from the previous setup and optional data stages may or may not have been completely removed from the FIFO 50. The challenge then is knowing what data in the FIFO is associated with the previous, now aborted, control request, and what data is associated with the current, still valid, control request. Embodiments of the invention operate to prevent any miscommunication by the device 20, and to ensure that the desired control request transaction is processed.

When the device 20 receives a setup token from the host 12, the write pointer 44 of the FIFO controller 40 is immediately "snapped" to the write starting address of the FIFO 50. Additionally, the read pointer 42 of the FIFO controller 40 is "locked" at its present address, and not allowed to increment further. This prevents stale data being inadvertently transferred out of the device 20. If there are multiple FIFOs 50 in a particular device 20, each operates independently from one another in that setup tokens or other actions for a particular endpoint (that is served by a particular FIFO 50), will not affect the operation of the other FIFOs.

The protocol handler 30 then begins a handshaking process with the hardware (e.g. the FIFO controller 40) so that the device 20 will not begin operating on the command sent by the host 12 until it knows that no new setup tokens have been sent from the host between the time the setup token was received and the time the command begins execution.

Figure 2:
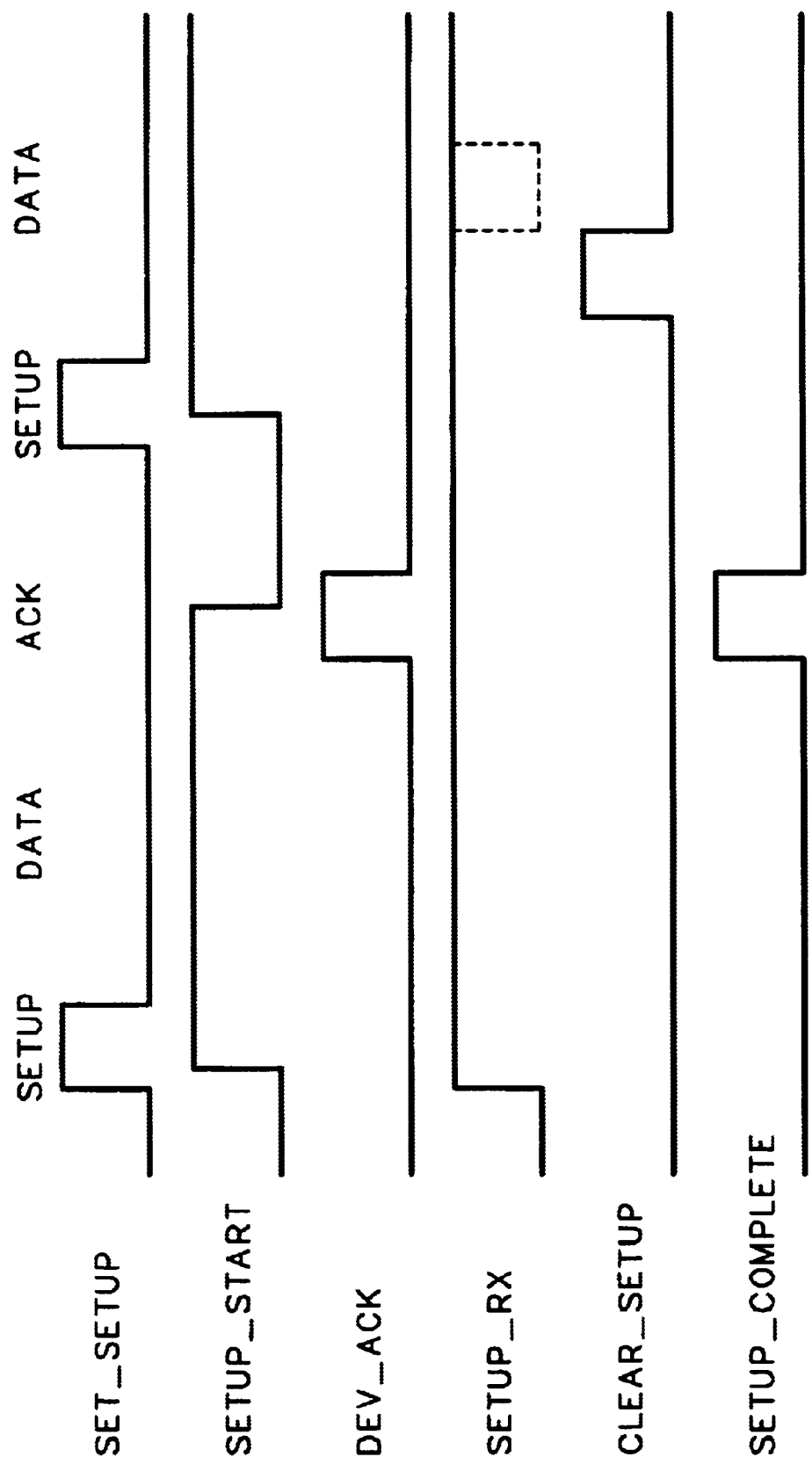
FIG. 2 is a chart illustrating example signals that can be used to implement embodiments of the invention.

With reference to the signal chart of FIG. 2, when the device 20 receives a setup token, the FIFO controller 40 pulses a "Set_Setup" signal, which is latched into a signal called "Setup_Start" and held HIGH until the setup stage has been successfully completed.

The Set_Setup pulse also triggers a "Setup_RX" signal indicating that a setup token has been received. The Setup_RX signal is made visible to the microprocessor 70 through a register. This signal is used to "freeze" the read pointer 42 of the FIFO controller 40, so that no data is mistakenly sent out of the FIFO 50 through a DMA. Data cannot be read from the FIFO 50 during the entire time that the Setup_RX signal is HIGH. In preferred embodiments of the invention, only the DMA process 62 or 64 that is associated with the addressed control endpoint when the setup token was received are halted and cleared. This can be performed in hardware directly by the DMA controller 60.

During the time that the signals Setup_Start and Setup_RX are HIGH, the device 20 is receiving data, which is most likely the setup stage data. After the setup stage data has been received, the device 20 sends a DEV_ACK signal back to the host 12. The DEV_ACK pulse at the end of the setup stage causes the Setup_Start signal to fall and a Setup_Complete pulse to be generated. Additionally, an interrupt may also be generated for the microprocessor 70.

Upon receiving the Setup_Complete signal, the microprocessor 70 attempts to clear the Setup_RX signal by writing to a register to generate the Clear_Setup pulse. In embodiments of the invention, the instructions that cause the microprocessor 70 to write to the register are loaded from the firmware 72. In this description, for clarity, this type of procedure will be referred to as being performed by "the firmware 72" where, as is well known in the art, the procedure is actually 'performed' by the microprocessor 70 based on instructions loaded from the firmware 72.

The hardware controlling the Setup_RX signal, which in some embodiments can be the protocol handler 30, clears the Setup_RX only if a new setup token has not been received in the meantime. If, however, a new setup token has been received prior to the Setup_RX signal being cleared, the protocol handler 30 again resets the write pointer 44 to the write starting address of the FIFO 50, thereby clearing the data just stored before the data can be acted on by the microprocessor 70, and prior to it being transferred anywhere by the DMA controller 60.

If an error occurs while processing data received from the host in that a setup token is received, thus causing the Setup_Start signal to be asserted, but the data packet is not received properly, then the Setup_Start signal will be reset by, for instance, the FIFO controller 40, and an error condition interrupt generated.

After reading eight bytes following a setup token, and before beginning to act on the data read, the firmware 72 checks the Setup_RX bit. If it is set, then new setup stage data has been received or is in the process of being received. In this case, the firmware 72 discards the eight bytes just read because that control transaction is being aborted, and waits for the Setup_Complete interrupt to fire again, if it hasn't already, to start processing the new request.

Generally, then, when the setup token is received, the FIFO controller 40 sets the write pointer 44 to the initializing location and locks down the read pointers 42, so no DMAs can be processed. The FIFO controller 40 only unlocks the pointers 42, 44 after a setup stage is fully received without having received another setup token. If another setup token is received, the earlier setup data is flushed, the write pointer 44 reset, and the new setup data loaded into the FIFO 50.

After the control request has begun to be received from the host 12, the firmware 72 operates according to the following schedule to process the control request. First the Setup_Complete interrupt is enabled, and waits for the interrupt to occur. At the appropriate time after the interrupt based on the Setup_Complete signal is received, the interrupt is cleared. The Setup_RX bit is also attempted to be cleared via the Clear_Setup pulse. If the Setup_RX signal is indeed cleared, this unlocks the read pointer from the FIFO 50, allowing the setup data stored therein to be read. After the data has been read, the firmware 72 checks the Setup_RX bit again. If it is still cleared, then the command just read can be processed. Otherwise, if the Setup_RX bit is high again, then another setup token has been received, and perhaps also its data. Therefore, the bytes just read from the FIFO 50 should be ignored. The protocol handler 30 then checks to see if the Setup_Complete interrupt is pending again. If so, new 8-bytes of data are read from the FIFO 50, and, if not, then the Setup_Complete interrupt is re-enabled and the device 20 waits for the interrupt to occur.

A legend for the different signals shown in FIG. 2 is reproduced below:

Set_Setup: A pulse signal generated when a setup token arrives.

Setup_Start: A signal set by a pulse on the Set_Setup signal. It is cleared by a subsequent Dev_ACK. This signal will be asserted when the device is in the process of receiving a setup stage data packet.

Dev_ACK: Output from USB interface controller block indicating that the device has acknowledged the receipt of an error free packet.

Setup_RX: This signal indicates a setup token was received. It is cleared by the protocol handler, but hardware does not allow the clear to occur unless Setup_Start is low.

Clear_Setup: This signal clears the Setup_RX signal if Setup_Start is low. It is pulsed by a command from the microprocessor 70.

Setup_Complete: This pulse signal, generated by, for instance, the FIFO controller, indicates that the setup stage is complete. This is an end of the Setup_Start and Dev_ACK. The DMA block latches the signal as an interrupt.

Setup_PSYCH (not shown in FIG. 2, but described): This pulse signal indicates that either a corrupt packet was received in the setup stage, or that the request received in the setup data packet will be handled by the USB interface controller without more intervention. This signal is used to clear the Setup_Start latched signal so the device 20 can continue to operate as normal.

Taking these steps described above ensures that the device 20 stops processing any data stage data from a previous control transaction, and that when the processor 70 attempts to access the new setup stage data, that it is indeed the correct setup data that will be read from the FIFO 50 first. In effect, the first eight bytes of the FIFO 50 (per endpoint) becomes an equivalent of a dedicated 64 bit register always used to store the setup stage data.

Although signals described with reference to FIG. 2 were referenced as being generated by particular hardware within the device 20, the particular hardware generating these signals is largely implementation specific. Thus, the system designer may ultimately choose which hardware is generating which signals. In some embodiments, the Set_Setup, Setup_Start, Setup_Rx, and Setup_Complete signals may be generated by either the protocol hander 30 or the FIFO controller 40, depending on partitioning by the system designer. Typically, the Dev_Ack signal would be generated by the protocol handler 30, and the Clear_Setup signal, as described above, would be generated by (or directed to be generated by) the microprocessor 70. Of course, these signal generation origins are only illustrative, and could be implemented in any effective way by the device 20.

Figure 3:
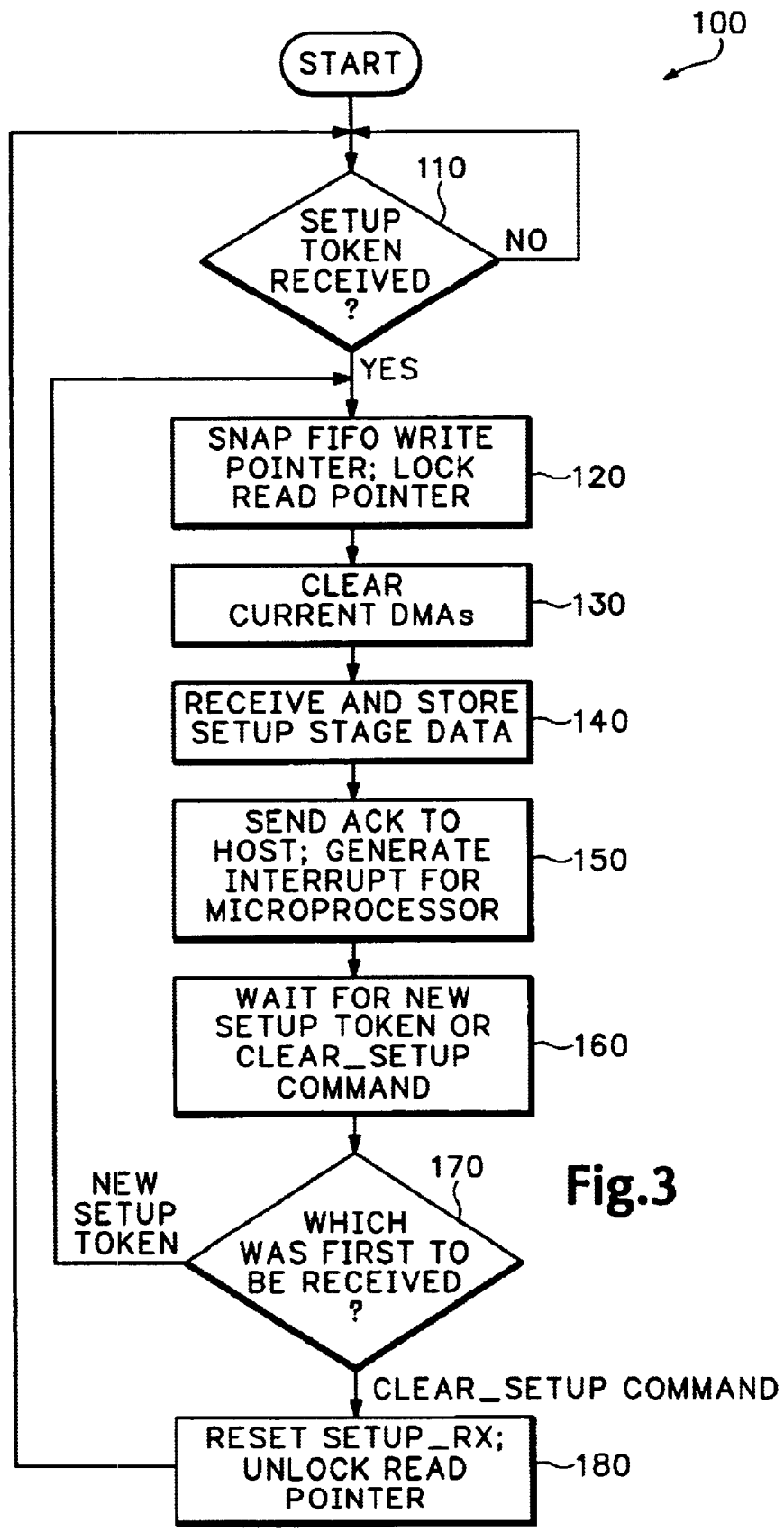
FIG. 3 is an example flow diagram illustrating processes that can be performed by hardware in a device controller according to embodiments of the invention.
Figure 4:
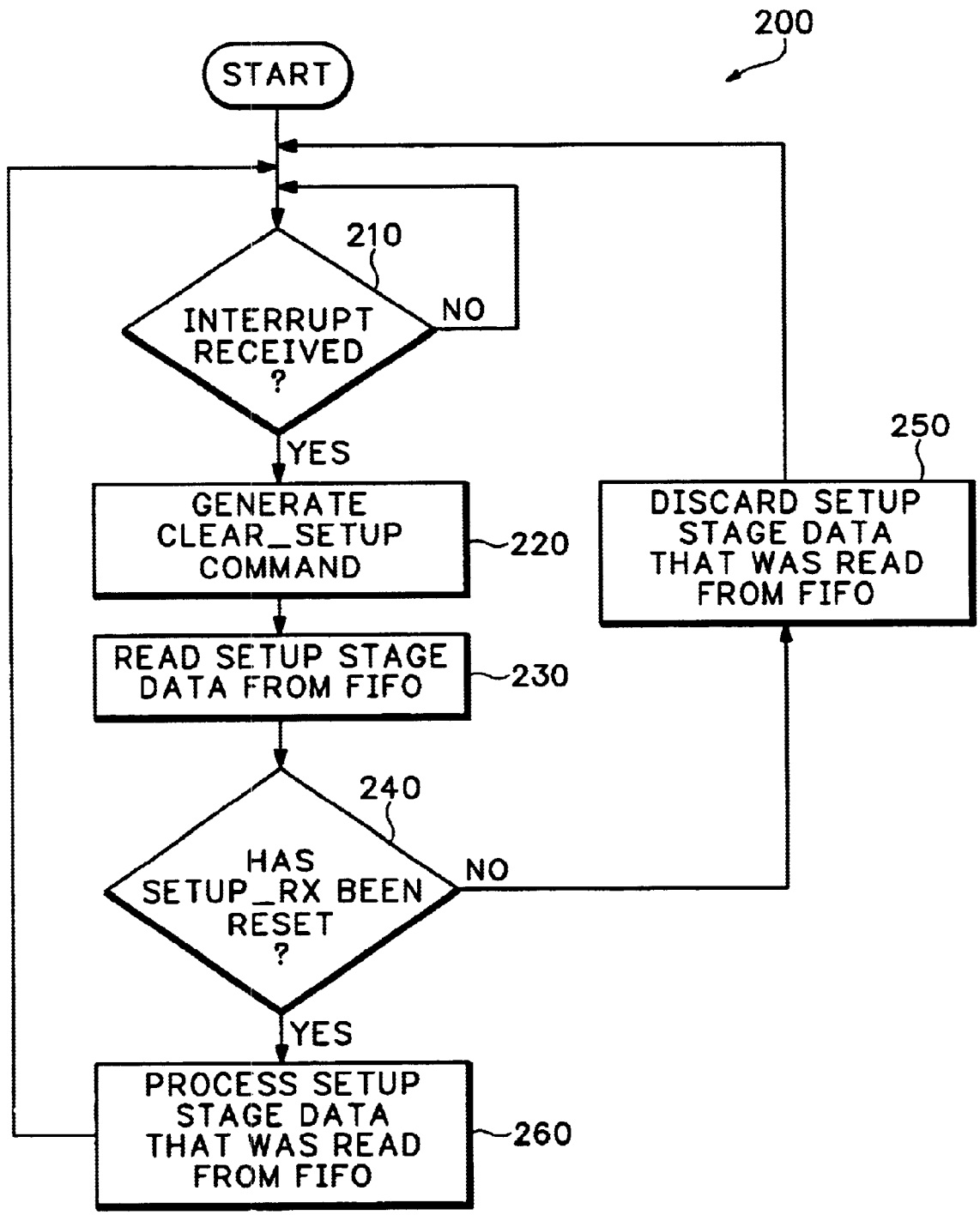
FIG. 4 is an example flow diagram illustrating processes that can be performed by a microprocessor in a device controller according to embodiments of the invention.

FIG. 3 is an example flow diagram showing processes that can be followed by hardware in the device 20, such as the protocol handler 30, FIFO controller 40, or either, in embodiments of the invention. An interrelated FIG. 4 is an example flow diagram showing processes that can be followed by the microprocessor 70 within a device 20. Together, the dedicated hardware, and programmed microprocessor 70 can implement embodiments of the invention. Of course, there are other ways to implement the invention, and described here is only one of the many implementation methods.

A flow 100 in FIG. 3 begins at 110 where a check is performed to determine if a setup token has been received at the device 20. When a setup token is received, the flow 100 proceeds to a process 120 that snaps the FIFO write pointer to the starting write position, and locks the read pointer in its current position. The process 120 also sets the Setup_Rx signal (FIG. 2), which is used to indicate to the microprocessor 70 that setup data is being received from the host 12. Next, in a process 130, the DMA controller 60 clears any DMA processes for the particular endpoint that received the setup token. This process may be performed more or less concurrently with the process 120.

The setup data that follows the setup token is received and stored in the FIFO 50 in a process 140. After the setup data has been received and stored, in a process 150 the protocol handler 30 sends an acknowledgment (Dev_ACK) back to the host indicating that the setup stage data has been received. When the acknowledgement is sent in the process 150, an interrupt for the microprocessor 70 is also generated to alert it that setup data has been received. Next, in a process 160, the flow 100 waits for either a command from the microprocessor 70 indicating that it has received the interrupt and is acting on it, or waits for another setup token from the host that indicates the first setup command is being replaced by a second command. The former will appear in the flow 100 as a "Clear_Setup" command received from the microprocessor, while the latter will appear as a new setup token received from the host.

Referring to FIG. 4, in a check 210 of a flow 200, the microprocessor 70 senses the interrupt generated by process 150 of the flow 100 (FIG. 3). When the interrupt is sensed at the microprocessor 70, the microprocessor attempts to reset the Setup_Rx signal by generating a Clear_Setup pulse in a process 220. The Clear_setup pulse is one of the signals shown in FIG. 2. Next, in a process 230, the microprocessor 70 reads data that was stored in the FIFO 50 by process 140 (FIG. 3).

The data read by the microprocessor 70 from the FIFO 50 may or may not be the correct data for the microprocessor to act on. It will be correct if the device 20 has received no new setup commands since receiving the command that prompted the present interrupt for the microprocessor 70. If the device 20 has received a new setup command, however, the data read by the microprocessor will be either old setup data that is going to be superceded by the new setup data, or, if the read pointer 42 of the FIFO 50 (FIG. 1) is still locked, will be garbage data.

The key to whether the data read by the microprocessor 70 in process 230 is correct or invalid is determined by the state of the Setup_Rx signal. Recall, with reference to FIG. 2, that the Setup_Rx signal is used to signal that the device 20 is receiving setup data from the host 12. The Setup_Rx signal also serves as a first part of an interlocked handshake between the hardware (protocol handler 30 and FIFO controller 40) of the device 20 and the microprocessor 70 of the device. If, after the microprocessor 70 reads the setup data from the FIFO 50 the Setup_Rx signal is still set, this indicates a new setup token has been received. In this case, the data read from the FIFO 50 is flushed in a process 250 and new setup data will be read by repeating the flow 200. If, instead, the Setup_Rx signal has been reset by the hardware, then no new setup tokens have been received at the device 20 and the setup data read by the microprocessor 70 can be acted on in a process 260.

Referring back to FIG. 3, the flow 100 will exit the waiting process 160 when either a new setup command is received by the device 20, or when the hardware in the device 20 receives the Clear_Setup command from the microprocessor 70. Therefore, in FIG. 3, a decision 170 makes a determination of which signal was received first. If a new token has been received, the flow 100 loops back to the process 120, where the write pointer of the FIFO 50 is reset to receive the new setup data. The read pointer of the FIFO 50 continues to be locked because the Setup_Rx signal was never reset. The flow 100 then continues by receiving the second set of setup data that follows the second setup token.

If instead the determination 170 of FIG. 3 indicates that the Clear_Setup signal was generated by the microprocessor 70 (in process 220 of FIG. 4) prior to receiving a second setup token, then a process 180 resets the Setup_Rx signal to its initial state. This unlocks the read pointer of the FIFO 50, allowing the setup data to be read by the microprocessor 70. The flow 100 of FIG. 3 is then complete because the setup token was received followed by receiving the setup data, with no intervening setup tokens. Therefore, the flow 100 returns back to the check 110 to wait for more setup tokens.

Referring back to FIG. 4, in a check 240 the microprocessor 70 determines if the Setup_Rx signal has been reset. In the case where another setup token was received at the device 20, the Setup_Rx signal is not reset, so the flow 200 exits in the negative to a process 250, where whatever data previously read from the FIFO 50 is discarded. This data is discarded because it is old and will be superseded by new setup data, or is otherwise garbage data because the read pointer is still locked. After performing the process 250, the microprocessor 70 then returns to normal processing and waits for another interrupt to occur indicating that new setup data has been received by the device 20.

Alternately, if no new setup tokens were received by the device 20, then the setup_Rx signal will be reset. Thus, the check 240 will exit in the affirmative (YES) and the setup data will be acted on in a process 260. Once the setup data has been acted upon, the flow 200 returns to normal processing to wait for further interrupts.

Therefore, embodiments of the invention operate by creating a linked handshaking process between the hardware of the device 20 and the microprocessor 70 functions. When a setup token is received, a receiving signal (Setup_Rx) is set and an interrupt generated for the microprocessor 70 to instruct it to read the setup data. The microprocessor 70 sends a command (Clear_Setup) when it is going to read the setup data. Then, the microprocessor 70 checks the receiving signal (Setup_Rx) directly before acting on the setup data it read. If the receiving signal (Setup_Rx) is still set, then, another setup command has been received at the device 20 and the setup data read by the microprocessor 70 is flushed. If, instead, the receiving signal (Setup_Rx) has been reset, then the setup data is ready to be acted on by the microprocessor. Therefore, embodiments of the invention wait until the last possible moment before acting on the setup data to ensure that no superceding setup tokens are received by the device 20.

It should be noted that the specific signals described with reference to FIG. 2 are not necessary for all embodiments of the invention. Concepts of the invention can be practiced by more or fewer signals, or different signals entirely.

Specific exemplary embodiments disclosed may have been described with reference to particular hardware, firmware, and functions. For example, a separate FIFO controller and DMA controller have been included in the device. However, no such requirement is made that these functions be separate, or, in some cases, even be present at all. For example, both the FIFO controller and DMA controller may be implemented in a single circuit, or could even be processes running on a dedicated processor. Additionally, although functions have been described as being performed by the protocol handler, these functions could be performed by any hardware or software process running on the device 20.

It should be apparent to those skilled in this art that the disclosed embodiments are exemplary and that various changes and modifications may be made thereto as become apparent by the present disclosure. Accordingly, such changes and modifications are considered to fall within the scope of the appended claims.

What is claimed is:

1. A method for processing a control transaction received at a device coupled to a host, the method comprising:

receiving a setup token at the device;

reserving a predetermined portion of a data buffer to store setup data; and preventing the predetermined portion of the data buffer from being read after receiving the setup token and before a complete data portion of the control transaction is received without errors.

2. The method of claim 1 wherein preventing the predetermined portion of the data buffer from being read comprises:

maintaining a read pointer of the data buffer at a position it was in when the setup token was received.

3. The method of claim 1 wherein reserving a predetermined portion of a data buffer comprises setting a write pointer of the data buffer to a first address of the data buffer.

4. The method of claim 3, further comprising:

receiving a second setup token at the device; and resetting the write pointer of the data buffer to the first address of the data buffer after the second setup token is received.

5. The method of claim 1, further comprising writing a first 64 bits of setup command data received at the device after receiving the setup token into a first 64 bits of a First In First Out (FIFO) buffer.

6. The method of claim 1, further comprising halting any Direct Memory Access transfers that were operating at the device when the setup token was received by the device.

7. The method of claim 1, further comprising:

latching a setup receive signal when the setup token is received; and unlatching the setup receive signal only after an entire set of setup command data is received by the device without errors.

8. The method of claim 1, further comprising transmitting an acknowledgement signal to the host after the setup command has been received.

9. A method for handling a Universal Serial Bus (USB) control request including a setup stage, the method comprising:

receiving a first signal that the setup stage is being transmitted;

setting a write pointer to a first position in a data buffer; and preventing at least a portion of the data buffer from being read after receiving the first signal and before a complete setup stage is received without errors.

10. The method of claim 9, further comprising latching a setup start signal for a duration of receiving the setup stage.

11. The method of claim 9, further comprising:

receiving a second signal that indicates a second setup stage is being transmitted; and, setting the write pointer to the first position in a FIFO buffer when the second signal is received.

12. The method of claim 9 wherein preventing at least a portion of the data buffer from being read comprises maintaining a read pointer of the data buffer at a position it was in when the signal was received.

13. The method of claim 9 wherein preventing the data buffer from being read comprises locking a read pointer data in the data buffer.

14. A control transaction handler, comprising:

a port coupled to a host and configured to receive a setup stage of a control transaction including a setup token and setup data;

a first pointer controller configured to reset a write pointer to a first position in a data buffer when the setup token is received; and a second pointer controller configured to lock a read pointer to a position in the data buffer it was in when the setup token was received by the transaction handler.

15. The control transaction handler of claim 14, further comprising a Direct Memory Access (DMA) processor that is structured to clear any DMA processes that were pending when the setup token was received.

16. The control transaction handler of claim 14, wherein the first pointer controller is configured to reset the write pointer to the first position in the data buffer when a second setup token is received by the transaction handler.

17. The control transaction handler of claim 14, further comprising a signal generator structured to generate a receiving signal when the setup token is received.

18. The control transaction handler of claim 17, further comprising a signal resetter structured to reset the receiving signal after receiving a signal that indicates the setup data is being read, unless a second setup token is received by the transaction handler prior to the resetter receiving the signal that indicates the setup data is being read.

19. The control transaction handler of claim 18, further comprising a command operator structured to operate on the setup data that was read only if the receiving signal is reset.

20. The control transaction handler of claim 14 wherein the port is coupled to a Universal Serial Bus.

* * * * *